(12) United States Patent
Bruce et al.

(10) Patent No.: US 9,635,538 B1
(45) Date of Patent: Apr. 25, 2017

(54) METHOD FOR DETERMINING INBOUND ROAMING TRAFFIC MARKET SHARE ON CELLULAR NETWORKS

(71) Applicant: Syniverse Technologies, LLC, Tampa, FL (US)

(72) Inventors: Robert G. Bruce, Riverview, FL (US); Dianne Albina, Lutz, FL (US); Kapil Jain, Temple Terrace, FL (US); Premanand Sivakkolundhu, Tampa, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 15/278,375

(22) Filed: Sep. 28, 2016

Related U.S. Application Data (60) Provisional application No. 62/302,157, filed on Mar. 1, 2016.

(51) Int. Cl.
*H04W 8/06* (2009.01)
*H04W 4/12* (2009.01)

(52) U.S. Cl.
CPC .............. *H04W 8/06* (2013.01); *H04W 4/12* (2013.01)

(58) Field of Classification Search
CPC ..... H04W 8/06; H04W 4/12; H04W 28/0247; H04W 8/02; H04W 24/08; H04W 28/08
See application file for complete search history.

(56) References Cited

U.S. PATENT DOCUMENTS

| | | | |
|---|---|---|---|
| 7,974,620 B1* | 7/2011 | Singh | H04W 48/18 455/432.1 |
| 2008/0125116 A1* | 5/2008 | Jiang | H04W 8/06 455/433 |
| 2009/0061854 A1* | 3/2009 | Gillot | H04W 24/00 455/432.1 |

FOREIGN PATENT DOCUMENTS

EP        1667484 B1     4/2007

* cited by examiner

*Primary Examiner* — Marcos Torres
(74) *Attorney, Agent, or Firm* — Andriy Lytvyn; Smith & Hopen, P.A.

(57) ABSTRACT

A method of determining inbound roaming market share of a host network is disclosed. The network subscribers are identified by their subscriber identity (IMSI). Each IMSI is categorized based on its roaming status. The roaming categories are as follows: successfully roaming, roaming but steered to another network, not roaming due to errors related to steering, not roaming due to errors not related to steering, roaming below a threshold, roaming below a threshold duration, and roaming on rival networks. SRI-for-SM results of SMS activity are used to determine the count of IMSIs roaming on rival networks. Market share is determined by calculating a quotient of the count of IMSI's categorized as successfully roaming on the host network and the difference between the total count of the IMSIs and the count of IMSIs categorized as not roaming due to errors not related to steering.

19 Claims, 10 Drawing Sheets

| IMSI | Dialog 1 | Dialog 2 | Dialog 3 | Dialog 4 | Dialog 5 | Dialog 6 | Dialog 7 | Result | Rationale |
|---|---|---|---|---|---|---|---|---|---|
| IMSI 1 | Success | Success | Success | SMS OTA | Loc Cancel | | | "B" | OTA steered |
| IMSI 2 | Success | Success | Success | SMS OTA | Loc Cancel | Success | | "A" | Border cell roaming maybe |
| IMSI 3 | Success | Success | Success | SMS OTA | Loc Cancel | Fail | | "B" | OTA steered later with handset tried Host Network 12 again, but was blocked |
| IMSI 4 | Success | Success | Success | SMS OTA | Loc Cancel | Fail | Success | "A" | Assume the 7 bit SMS was something else like a MMS |
| IMSI 5 | Success | Success | Success | SMS OTA | Fail | Success | | "A" | Assume the 7 bit SMS was something else like a MMS |
| IMSI 6 | Success | Success | Success | Fail (steering) | | | | "A" | SS7-based steering Initial release will treat as "A" since there was some success. Subsequent release may be "A" then "C" for portions of the day. |
| IMSI 7 | Success | Success | Success | Fail (non-steering) | Success | Success | | "A" | Just a technical glitch. Initial release will treat as "A" since there was at least one success. Subsequent release may treat as "A" then "F" then "A" again. |
| IMSI 8 | Fail | Fail | Fail | Not seen SMS OTA to Host Network 12 | Success | Success | | "A" | IMSI was on another network then gets rejected on Host Network 12 at first, then home OTA steers him to Host Network 12. A Fail then Success would be observed, but not the OTA /Cancel itself |
| IMSI 9 | Success | Success | Success | Success | Success | Success | | "A" | IMSI was on another network and does not attempt to register on Host Network 12 then home OTA steered to Host Network 12. We would not see the OTA steer/Cancel. |

METHOD FOR DETERMINING INBOUND ROAMING TRAFFIC MARKET SHARE ON CELLULAR NETWORKS

CROSS-REFERENCE TO RELATED APPLICATIONS

This nonprovisional application claims priority to U.S. Provisional Patent Application No. 62/302,157, entitled "A METHOD FOR DETERMINING INBOUND ROAMING TRAFFIC MARKET SHARE ON CELLULAR NETWORKS," filed Mar. 1, 2016, the entirety of which is incorporated herein by reference.

BACKGROUND OF THE INVENTION

1. Field of the Invention

This invention relates to mobile communications. More specifically, the invention relates to a method for determining inbound roaming traffic market share for a specific host network.

2. Brief Description of the Related Art

It has become very important for a mobile network operator to know its inbound roaming market share so that it can be better informed in negotiations with other networks with roamers in the host network's country. The host network (visited operator) has no easy reliable means of knowing whether the home operator is steering an adequate share of the inbound roamers to it. For any host operator, determining its market share from a given foreign home network relative to the market share of competing operators in the same country is valuable information. Accordingly, there is a need for essential intelligence associated with the inbound roaming traffic market share because this intelligence would improve the contract negotiations between the host network and home networks. The host network would gain an important advantage by knowing its inbound roaming market share from the respective roaming partner in negotiating business deals to acquire additional roamers into its own network thereby generating more roaming revenue.

One method for determining inbound roaming traffic is disclosed in U.S. Pat. Pub. No. 2009/0061854. That method relies on polling methods of a sample of roamers to determine which ones are registered with the host network and which ones are registered on rival networks. Analyzing signaling messages from subscribers and determining via a gateway the host network's roaming arrangement with non-host network. This approach has several major shortcomings that undermine its efficacy and general applicability. Polling techniques require transmission of messages to a sample of roamers. Transmission of polling messages to roamers on rival networks may be prohibited by those networks, thereby significantly reducing applicability of the method disclosed in the '854 Publication. Sample size of the roamers being polled and sample selection may also have significant effects on accuracy of the polling results.

Accordingly, what is needed is a novel solution for determining the inbound roaming market share that does not require polling and, instead, uses a different approach based on an existing data capture solution.

SUMMARY OF THE INVENTION

The long-standing but heretofore unfulfilled need for a method of calculating a host network's inbound roaming market share is now met by a new, useful, and nonobvious invention. The invention includes a server receiving copies of the messages exchanged between the host network's visitor location register (VLR) server and a plurality of home networks' home location register (HLR) servers. For each IMSI registered on the host network, the invention determines a duration during which that IMSI remained registered on the host network during a predefined time period. If this duration exceeds a predefined threshold, the IMSI is categorizing as successfully roaming on the host network. The invention tracks the count of IMSI within this category (Category A).

The invention utilizes send routing information for short message (SRI-for-SM) results of short message service (SMS) activity between IMSIs registered on the host network and IMSIs not registered on the host network to determine a count of IMSIs roaming on rival networks (Category D) in the host operator's country. In the next step, the invention establishes the count of IMSIs that are not registered on the host network due to errors not related to steering (Category E). The invention then determines a total count of roamers—IMSIs hat attempted register on the host network (Categories A, B, C, E, and F) and also those roaming on rival networks (Category D).

The inbound roaming traffic market share of the host network is obtained by finding a quotient of the first count and a difference of the total count and the third count (i.e., $A/(TC-E)$).

The total count of IMSIs observed by the server comprises IMSIs classified within the following categories: Category A—successfully roaming on the host network, Category B—were roaming on the host network but steered to a rival network, Category C—not roaming on the host network due to errors related to steering, Category D—roaming on the rival network without attempting to register on the home network, Category E—not roaming on the host network due to errors not related to steering, and Category F—roaming on the host network for a duration below the threshold duration.

IMSIs showing successful registration on the host network for a duration greater than a predefined threshold are placed in Category A. IMSIs showing successful registration on the host network for a duration less than the predefined threshold are placed in Category F. IMSIs showing successful registration on the host network and a subsequent SMS followed by a location cancel within a predefined duration and no subsequent activity are placed in Category B. IMSIs having only failure messages due to steering return errors are classified in Category C. IMSIs having failure messages due to non-steering return errors are classified in category E.

The count of IMSIs in Category D is obtained according to the following steps. A ratio is calculated, wherein a numerator in the ratio is the number of recipient IMSIs in SRI-for-SM query results that have not requested to register on the host network and a denominator of the ratio is a total count of recipient IMSIs in SRI-for-SM query results for a given host operator's country. This ratio is then multiplied by the count of IMSIs that have requested to register on the host network, thus, yielding the count of IMSIs in Category D.

In an embedment, the duration during which each IMSI remained registered on the host network is calculated as an aggregate over the predefined time period. In an embodiment, the predefined time period is a 24-hour Greenwich Mean Time (GMT) day.

The inbound roaming market share is calculated separately for voice services and data services.

DESCRIPTION OF THE DRAWINGS

For a fuller understanding of the invention, reference should be made to the following detailed description, taken in connection with the accompanying drawings, in which:

FIG. 5 is a table illustrating an exemplary analysis for nine (9) IMSIs according to the method depicted in FIG. 3;

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and structural changes may be made without departing from the scope of the invention.

Figure 1:
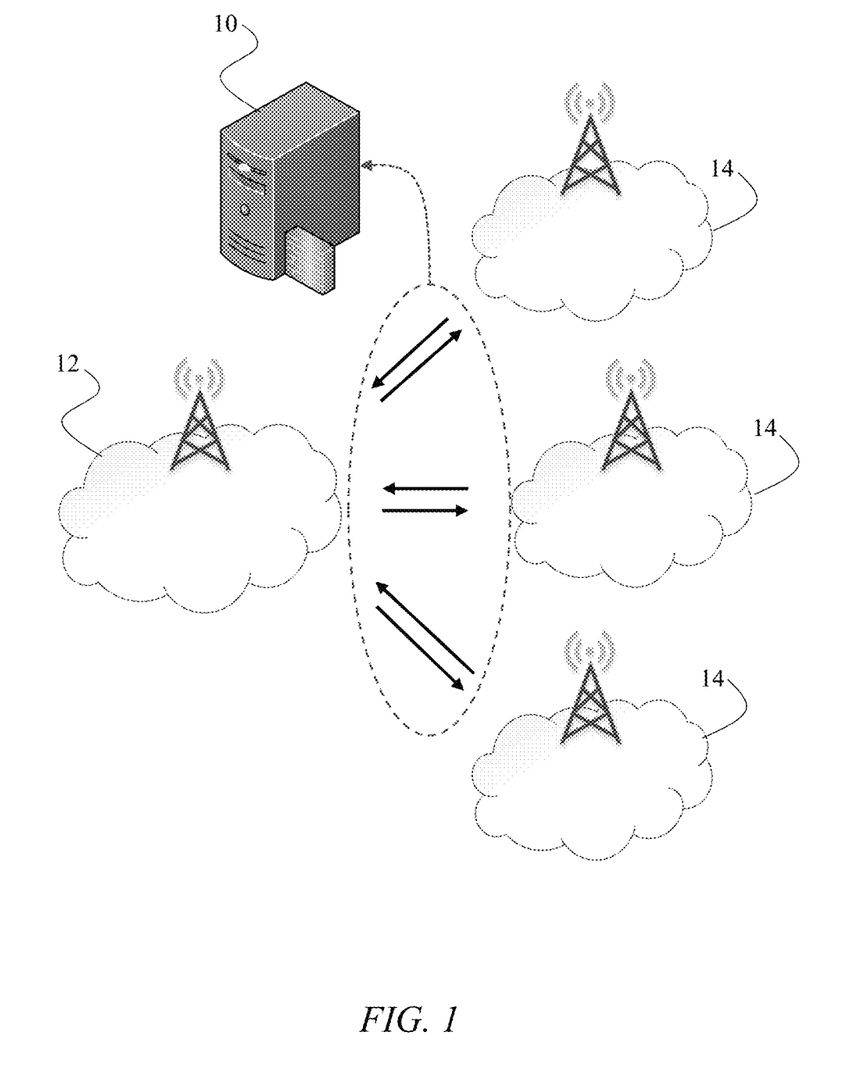
FIG. 1 is a diagram depicting a server in communication with the host network and a plurality of home networks.
Figure 2:
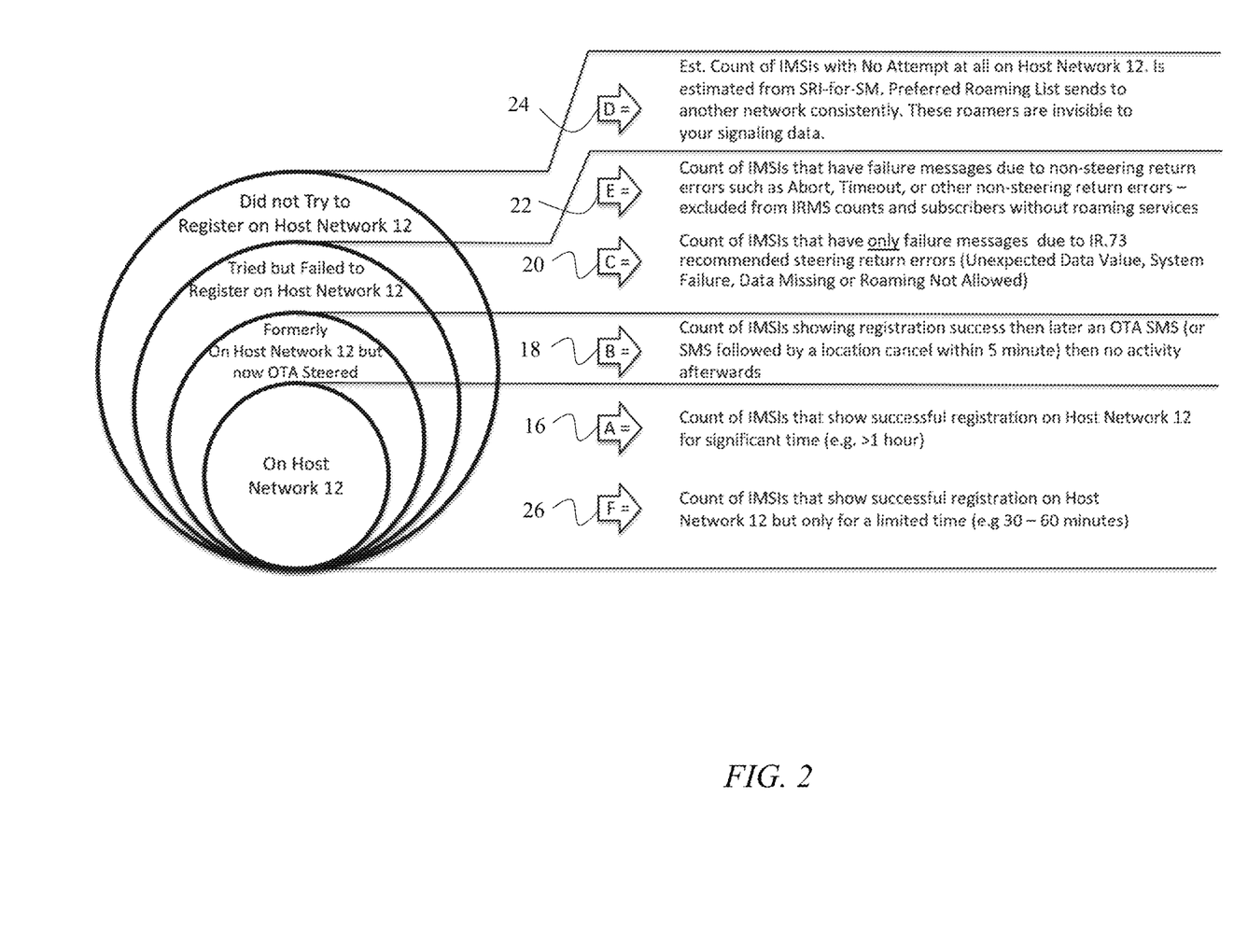
FIG. 2 is a chart depicting six (6) categories into which roaming IMSIs can be classified.

The invention comprises a server 10 that observes communications between host network 12 and home network 14 as depicted in FIG. 1. Server 10 receives copies of messages transmitted between the visiting location register (VLR) server of host network 12 and home location register (HLR) servers of home networks 14, but does not actively transmit any messages either to host network 12 or home networks 14. Because of this configuration, server 10 is capable of identifying roamers based on their international mobile subscriber identities (IMSIs) and observing signaling data while these IMSIs are roaming on host network 12. The present invention uses this signaling data to estimate an inbound traffic market share for host network 12. The following information is stored for each message signal unit (MSU):

App Context (NLUs, GPRS NLUs, SMS MO, and SMS MT only)
Time stamp
Serve node's MCC/MNC
Home IMSI's MCC/MNC
Results FIG. 2 illustrates that roamers on a host network 12 can be subdivided into the following six categories based on their activity with respect to host network 12. IMSIs that maintain successful registration on host network 12 for a total aggregate duration exceeding a predefined threshold within a predefined time period are classified in Category A (16). IMSIs that are at first successfully registered on host network 12, but then receive and over-the-air (OTA) steering message via short message service (SMS) and leave the network within a predefined period of time upon receipt of the OTA SMS are considered to be OTA steered to another host network. These IMSIs are classified in Category B (18). Category C (20) comprises the IMSIs that attempted but were unable to register on host network 12 due to steering related errors. Category E (22) comprises IMSIs that attempted but were unable to register on host network 12 due to error not related to steering. An estimated number of IMSIs who do not attempt registration on host network 12 are classified in Category D (24). Finally, IMSIs who successfully register on host network 12, but remain registered for duration below a predefined threshold and who do not fall in any of the above-listed categories are classified in Category F (26). IR.88

IMSIs in categories A, B, C, E, and F are visible to host network 12 because they transmit signaling messages to host network 12 at least during initial registration attempt. These signaling attempts are observed by server 10. If a roamer is successfully registered on host network 12, then server 10 can also observe subsequent activity of the roamer on host network 12 and can determine when the roamer is steered to another host network. Server 10 passively observes signaling messages of the roamer on host network 12 without relying any kind of active polling. Only the signaling data that passes through server 10 is used for determining the inbound roaming market share of host network 12. In other words, the present invention does not actively poll a sample of roamers—instead, server 10 observes signaling messages of the roamers on host network 12, and only this data is used for inbound roaming market share calculation.

Figure 3:
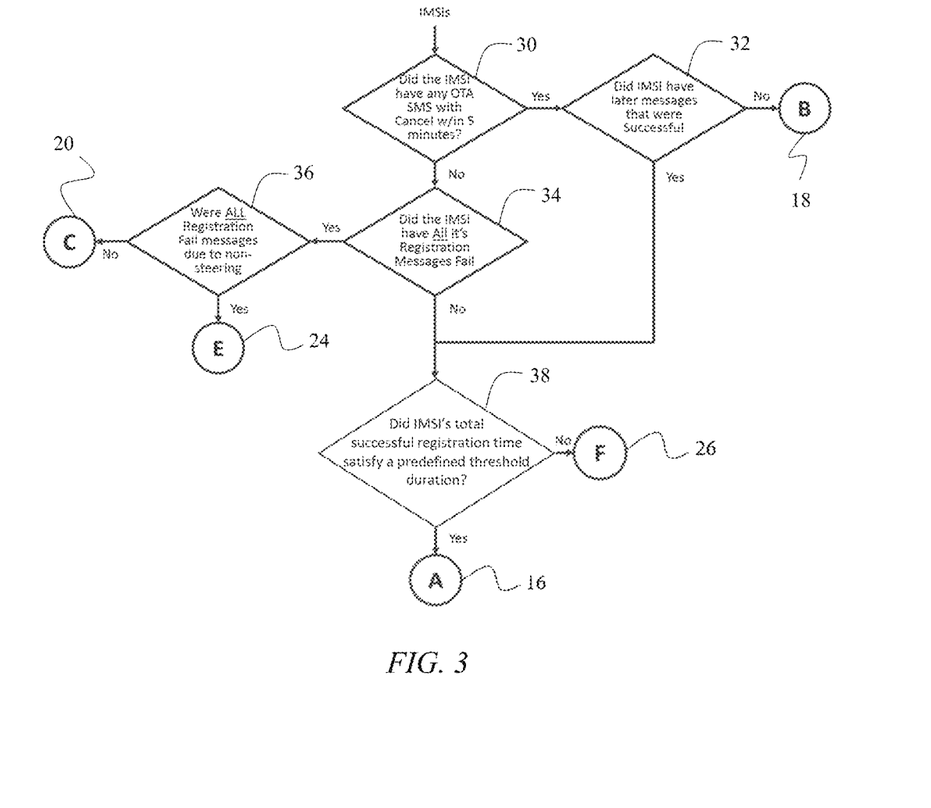
FIG. 3 is flowchart depicting a method of determining into which of Categories A, B, C, E, or F a roaming IMSI that at least attempted to register on the host network should be placed.

FIG. 3 illustrates the method according to which inbound IMSIs are categorized as A, B, C, E, or F. The inbound roamers are grouped into the above categories according to the way they interact with host network 12. At the end of each GMT day (or another predefined time period), the invention determines the category of each IMSI on host network 12. This must be done for both voice and data separately. In other words, an IMSI can be categorized in one category for voice service and in another category for data services. This means that the invention will have counts for each operator pair for NLUs for Voice Services and for GPRS NLUs for data services.

An exemplary method for determining the category into which a particular IMSI falls is schematically illustrated in FIG. 3. The categories A, B, C, D, E, and F are mutually exclusive. If an IMSI falls into one of the categories, then it may not be categorized in any other category.

In Step 30, the invention checks for whether the IMSI has any OTA SMS messages followed by a location cancellation within a predefined time period (5 minutes in this example). If this criterion is met, in step 32, the invention checks whether IMSI has had subsequent OTA SMS messages that were successful—if subsequent messages were also unsuccessful, then the IMSI is placed in Category B, meaning that the roamer had successfully registered on host network 12, but then was OTA steered to another host network.

If it is determined that the IMSI did not have any OTA SMS messages with a location cancellation within a predetermined duration, the method proceeds to step 34. In this step, a check is performed as to whether the IMSI has had all of its registration messages fail. If this is true, the method proceeds to step 36, in which it determines whether the IMSI should be categorized as C or E. If all registration fail messages were due to non-steering, the IMSI is placed in Category E. Otherwise, the IMSI is categorized as an C.

Finally, if the IMSI did not have any OTA SMS messages with a location cancellation within a predefined period of time and not all of its registration messages failed, the method proceeds to step 38. In this step, the method checks whether the IMSI's total registration time has exceeded a predetermined duration (for example, 30 minutes). If the answer is "yes," then the IMSI is categorized as an A—otherwise, it is categorized as an F.

If the invention determines that a roamer's IMSI is in two cellular network host (i.e. serving) markets on a particular day, each market will be assessed separately, and that roamer will be included in market share analyses for both markets. In some circumstances, a roamer may fall into the same category in both markets. For example, a subscriber flying to Paris, France then to Rome, Italy may be categorized as an A in both Paris and Rome. In other circumstances, a subscriber may be classified differently in each market. For example, the roomer may be an A in France and C in Rome. The analysis is performed separately per each host network 12 utilizing the invention.

Figure 4:
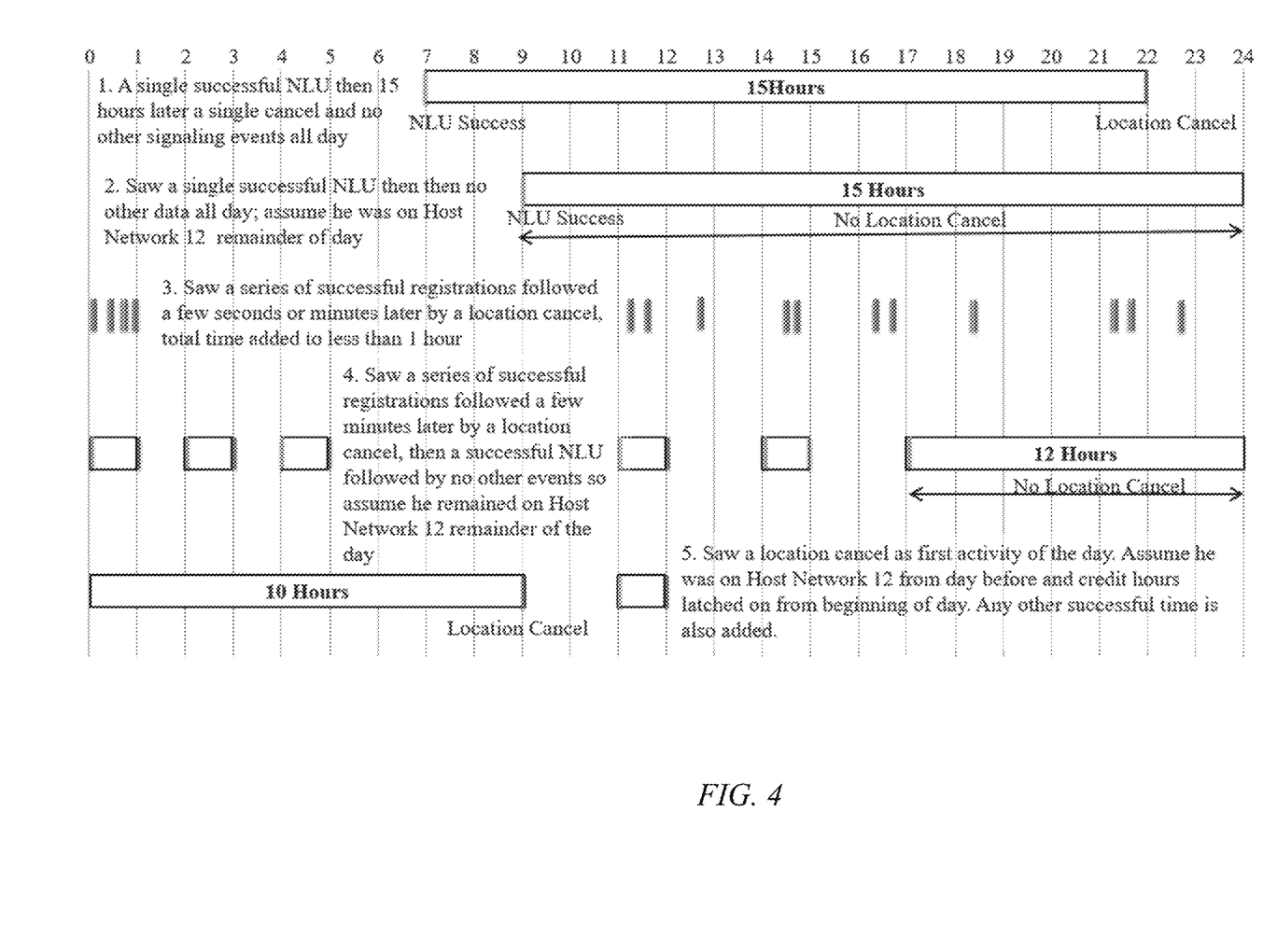
FIG. 4 depicts examples of various signaling pattern in a 24-hour period.

FIG. 4 provides an example of various behaviors for roamers in a 24-hour period. FIG. 4 further provides a rationale for how the duration during which each IMSI remained on Host Network 12 is determined. FIG. 5 is a table containing examples of signaling observed by server 10 indicating in which category each IMSI is placed based on the observed signaling.

Each category A, B, C, E, and F and analysis associated therewith are described in more detail below.

Category A—Successfully Roaming

These subscribers have been on Host Network 12 for one or more registration successes for a significant (configurable) amount of time.
 1. The configurable amount of time will be global for all roaming partners but separate for voice and data. Separate configurations may be allowed for specific host-home network pairs. These individual configurations would be for the specific host-home network pairs while the global settings would establish the default threshold for all other host-home network pairs.
 2. 0 is a valid value for the configuration.
 3. The default threshold duration that must be met by an IMSI to be classified in Category A can be configured based on a variety of factors. One exemplary threshold that has demonstrated consistent reliable results is 30 minutes. This duration, however, is merely exemplary and may be adjusted as necessary.
 4. The time is counted cumulative per IMSI per 24-hour GMT day. (i.e., a user who registers 10 times for 6 minutes each time is cumulatively on the Host Network 12 for a total of 60 minutes during the 24 hours).
 5. A user who ends a GMT day with a valid registration without a cancelation will begin the next GMT day as on Host Network 12.
 6. Alternatively, if the invention observes a cancelation as the first event of the day, it will be assumed that the user was present from the start of the GMT day.
 7. If a cancelation is not observed, then the IMSI will be counted as on the network for a configurable number of days then assume the subscriber left the market, but the home did not send a cancel (or it was missed). The default will be 4 days as global configurations. In alternative embodiment, separate configurations per serve country may be enabled and may include other application contexts, such as RNE that would indicate the subscriber is still present.
 8. Time is counted between a registration and a location cancelation.

Category B—Roaming/Steered to Another Network Via OTA

These subscribers were roaming successfully on a particular network, but were then OTA steered to another network. For these subscribers, the invention detects SMS 7-bit encoding (0x7F) and then a location cancel within a configurable number of minutes.
 1. Configuration will be default to predefined duration (e.g., 5 minutes), valid values are 1 to 60.
 2. If a user with this scenario re-enters the market, the user will not be categorized as a B and, instead, will be considered an A or an F (i.e., this addresses border cell roaming issues).

Category C—Not Roaming/Errors Related to Steering

These subscribers are not roaming successfully on the particular network (all errors are observed) and the errors are related to steering In an embodiment, error logging may be global—i.e., all roaming partners will use the same errors. In an alternative embodiment, the error logging be customized per roaming partner (i.e., one provider may use Roaming Not Allowed, whereas another provider may use Unexpected Data Value).

In one embodiment, a subscriber will be considered to be a C or an E only if all the registrations during a particular 24-hour period are errors. In an alternative embodiment, an IMSI that has successful registrations at beginning of the day but then starts getting failures later in the day may be classified in the category A for a portion of the day and in category C or E for another portion of the same 24-hour period.

The globally configurable errors considered as "steering errors" for category C include:
 1. Roaming Not Allowed
 2. Unexpected Data Value
 3. Data Missing
 4. System Failure
 5. All different versions (v1, v2, v3) apply to all of the above.
 6. A user with one of the four above "steering errors" and "other non-steering errors" will be included in C, not E A user with one or more successful registration messages and one or more failures will be considered either A or F, not C or E.

Category E—not Roaming/Errors not Related to Steering

These subscribers are not roaming successfully on the particular network (all registrations are errors) and the errors are exclusively NOT related to steering.
 1. Those observed subscribers who are not A, B, C, or F are classified as E
 2. Subsequent prepaid subscribers with 0 balance would be in this category (requires CAMEL)
 3. If a user has ALL errors but some are steering and some are not steering, then the user is classified are in the category C. All errors must have exclusively non-steering errors in order for a user to be classified in the category E.

Category F—Roaming Below Threshold

These subscribers were successfully roaming on host network 12, but only for a short amount of time in cumulative during the analysis period (e.g., GMT day). They have one or more successful registrations but total less than the globally configurable duration predefined for the category A.

Category D—Roaming on a Rival Host Network

Category D comprises roamers who are roaming on rival host networks and do not attempt to register on host network 12. These are IMSIs that land in the specified network's serve country but latch on to a rival network because the rival network may have a stronger network or because the rival network is in a preferred roaming list (PRL) provisioned on the handset. These IMSIs are not observed on host network 12 at all.

This creates an issue because, as evident from FIG. 2, Category D (24) can make up a significant portion of the total number of roamers in any given market. The invention provides a novel and non-obvious solution to this problem. Because the roamers in Category D (24) do not register on host network 12, their signaling cannot be directly observed. However, the SMS traffic between IMSIs registered on host network 12 and IMSIs registered on rival host network can be observed at short message service center (SMSC) 42. Thus, the SMS traffic—rather than registration—determines whether an IMSI falls within the category D.

Because the roamers within Category D are not observed on host network 12, they cannot be counted directly and, therefore, their quantity is estimated. One way to estimate the quantity of roamers within Category D is by examining the SRI (Send Routing Information) for SM results of SMS activity that is observed on host network 12. This method is illustrated in FIG. 6.

Figure 6:
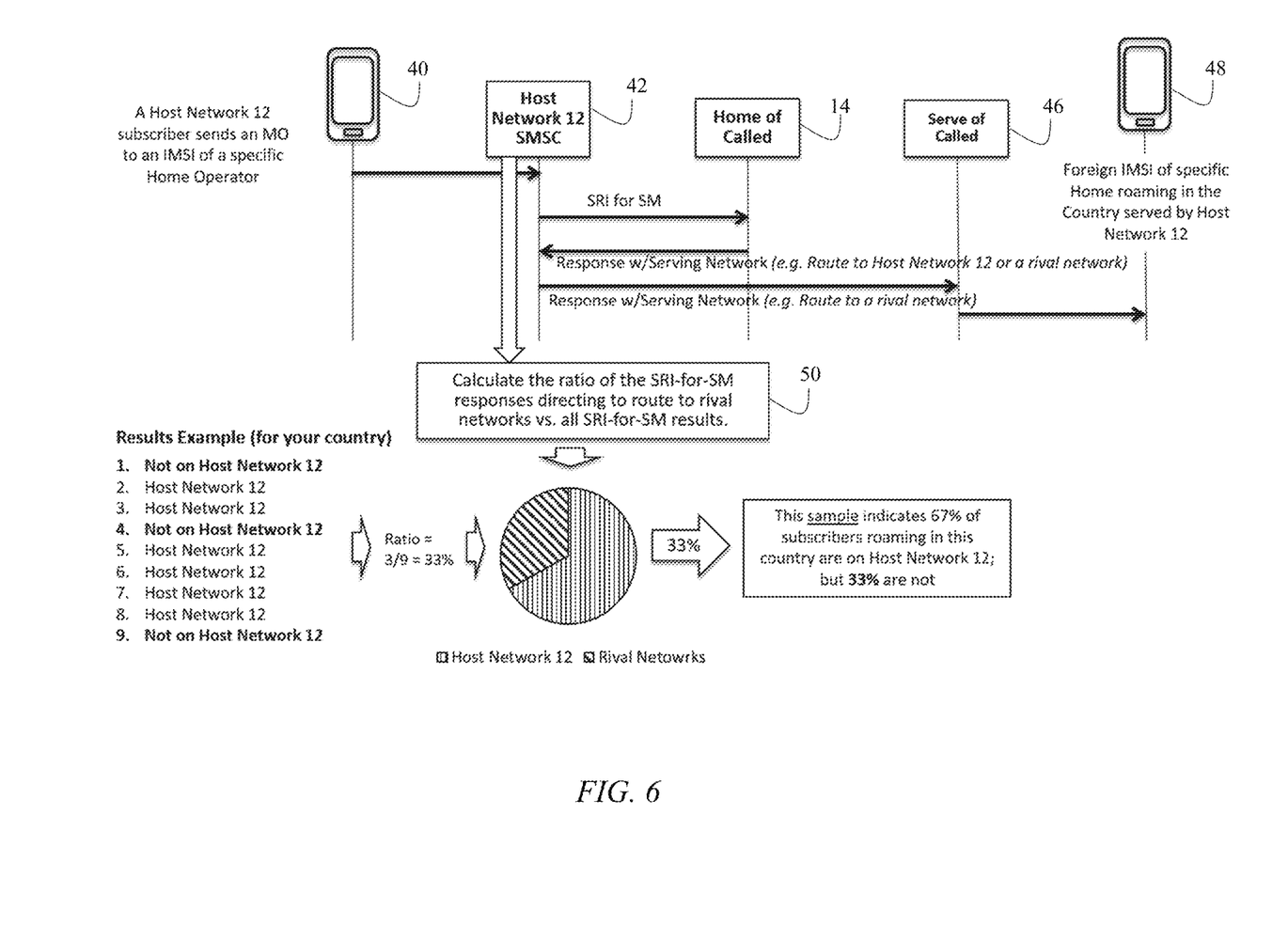
FIG. 6 is a diagram illustrating a method of observing SRI-for-SM results of SMS activity between subscribers of the host network and roaming IMSIs to determine a ratio of IMSIs roaming on rival networks.

As depicted in FIG. 6, when a subscriber 40 of Host Network 12 sends an outgoing SMS message Host Network's 12 short message service center (SMSC) 42 transmits an SRI-for-SM signal to home network 14. Home network 14 responds to SMSC 42 with an SRI-for-SM result directing SMSC 42 to route the message either to Host Network 12 or to a rival network. SMSC 42 routes SMS messages from subscribers of Host Network 12 to the serve network 46 which then transmits the SMS message to recipient 48.

FIG. 6 further depicts an example in which SRI-for-SM results identify nine (9) IMSIs, six (6) of which have been observed on Host Network 12 and three (3) that have not. This yields a ratio of 33% indicating that 67% of SMS recipients are roaming on Host Network 12 while 33% are roaming on rival networks.

Some of IMSIs associated with recipients of SMS messages have been already observed by server 10: these IMSI are thus categorized in one of Categories A, B, C, E, or F per the method disclosed above. However, some of the IMSIs to which SMSC 42 routes SMS messages have not been observed on Host Network 12 and have not been categorized. These IMSIs have not attempted to register on Host Network 12 and, instead, have been roaming on rival networks. To estimate the number of these roamers, in step 50, the ratio of IMSIs to whom SMSC routes SMS messages that are known to server 10 (i.e., those categorized in A, B, C, E, or F) to the total number of roamers to whom SMSC 42 routes SMS messages. This ratio is then multiplied by the Total Count of IMSIs within categories A, B, C, E, and F to obtain an estimated number of roamers within Category D. This method is depicted in FIG. 7.

Figure 7:
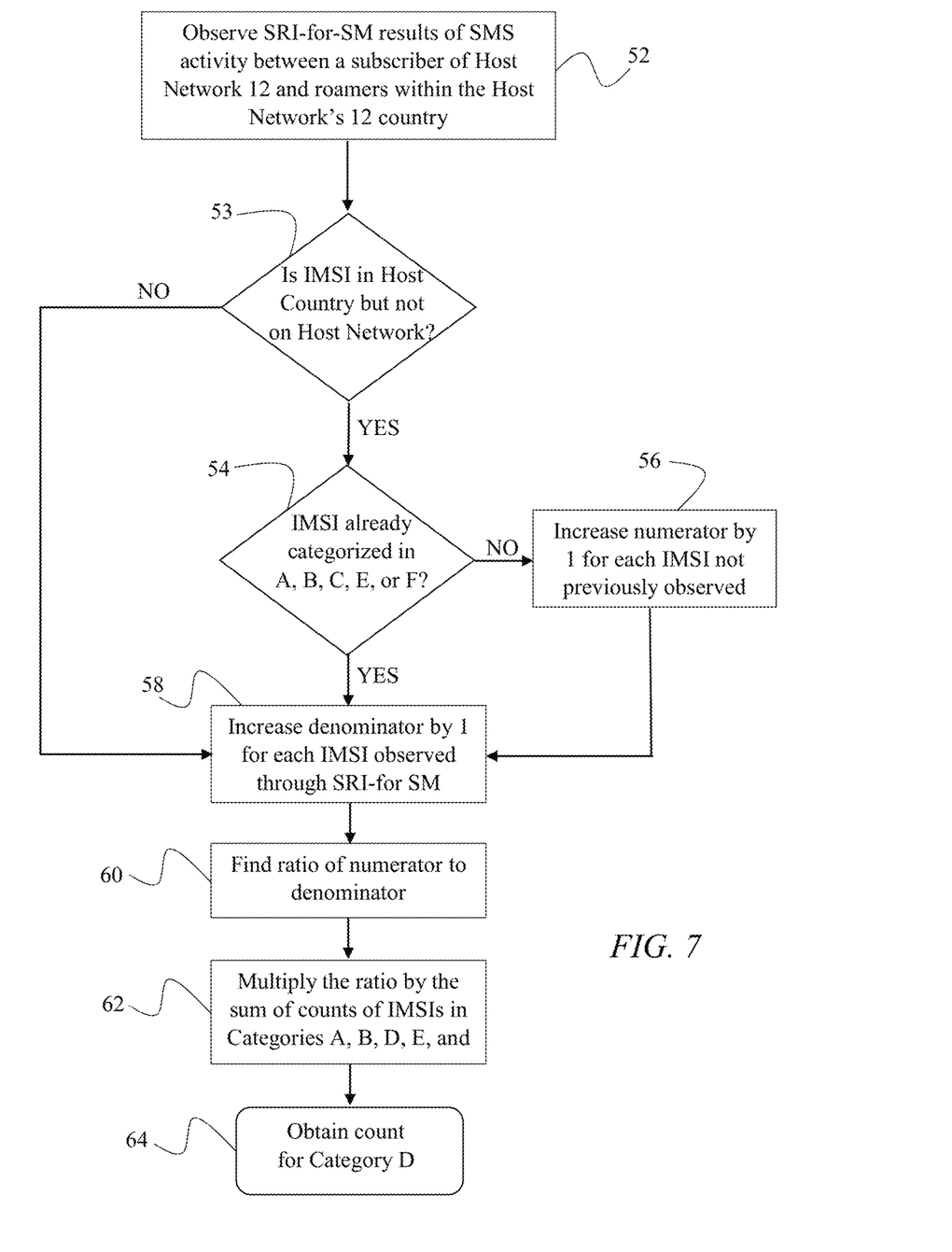
FIG. 7 is a flowchart depicting a method of obtaining the count of IMSIs in Category D.

As FIG. 7 illustrates, in step 52 SMSC 42 observes SRI-for-SM results of SMS activity between a subscriber of Host Network 12 and IMSIs within the relevant market. In step 53, the invention determines whether the observed IMSI is in host country but is not registered on Host Network 12. If the answer is "yes," the invention proceeds to step 54, otherwise, the invention proceeds directly to step 58. In step 54, a determination is made whether IMSI of the message recipient has already been categorized in A, B, C, E, or F. If IMSI has not been previously categorized, that means that IMSI is roaming on a rival network and has not attempted to register on Host Network 12. For each unique IMSI not previously seen on Host Network 12, a numerator is increased by 1 count. In step 58, every IMSI in SRI-for-SM result is counted in denominator. The ratio of the numerator and the denominator is obtained in step 60. In step 62, the ratio is multiplied by the sum of counts of IMSIs that have been observed on Host Network 12—i.e., IMSIs already categorized in Categories A, B, C, E, and F. The product yields the count for Category D in step 64.

In an embodiment, there is an override configuration per home operator for SRI-for-SM percent which is utilized if the number of observed SRI-for-SM is less than a configured threshold. For example, if a home operator, for which the Host Network is trying to determine the inbound roaming market share, is using home-based routing or hub solution so that SRI-for-SM calculations are invalid, or insufficient sample size, the override configuration will be used. A sufficient sample size for home operator is configurable, but defaulted to 200. (i.e., until there is a sufficient sample size, the SRI-for-SM will be the override configuration). The GMT-day's SRI-for-SM is used unless it does not meet the valid sample size defined above, in which case the last seven GMT days' SRI-for-SM results will be aggregated and used. If the aggregated number of roamers is less than a predefined sample size in the past 7 days, then the override configuration will be used.

Calculating Market Share

To determine Market Share (MS), the following formula is used: MS=A÷(sum of A+B+C+D+F) for a given operator pair for a given day. However, since D variable represents a percent value, the equation must first be solved for D before the market share (MS) can be determined.

Figure 8:
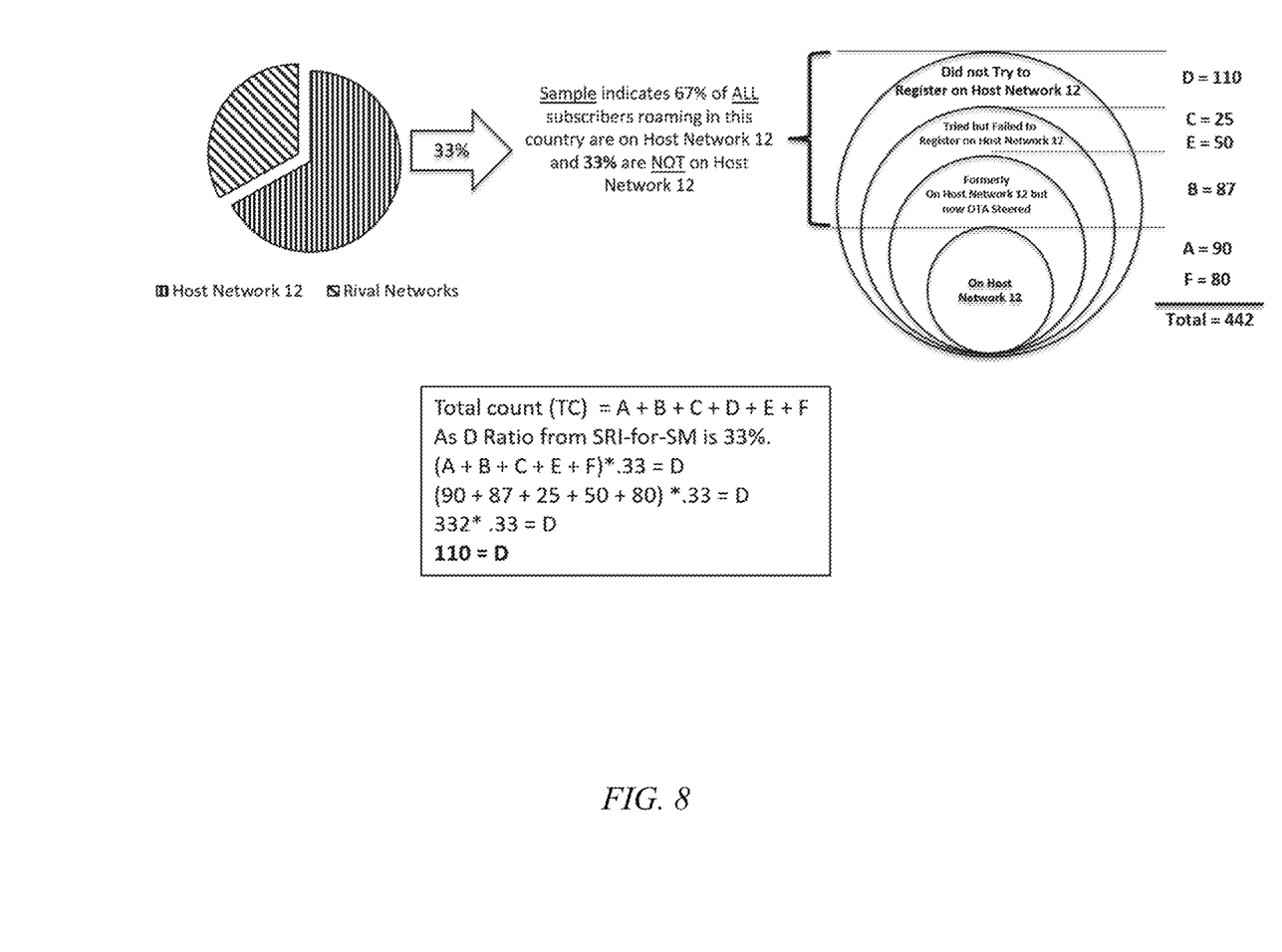
FIG. 8 is a diagram depicting an exemplary scenario for which the count of IMSIs in Category D is obtained.

An example of a market share calculation is depicted in FIG. 8. First the count of IMSIs in Category D must be calculated per method depicted in FIG. 7 and described above. In this example, 90 IMSIs are in Category A, 87 in Category B, 25 in Category C, 50 in Category E, and 80 in Category F.

For D there are two measures:

D1 is the Result of SRI-for-SM query by serve carrier where recipient IMSI was not seen in any category A, B, C, E, or F on host network 12.

D2 is the result of SRI-for-SM query by serve country.

D3 is the ratio of D1÷D2×100%. For example, if D1 is 3 and D2 is 9 then D3=33%.

Total Count (TC)=*A*+*B*+*C*+*D*+*E*+*F*

Since D3 Ratio for SRI-for-SM analysis is 33%, then (*A*+*B*+*C*+*E*+*F*)*0.33=*D*

So, if A=90, B=87, C=25, E=50 and F=80,

Then (90+87+25+50+80)*0.33=*D*

So, 332*0.33=*D*

*D*=110

Figure 9:
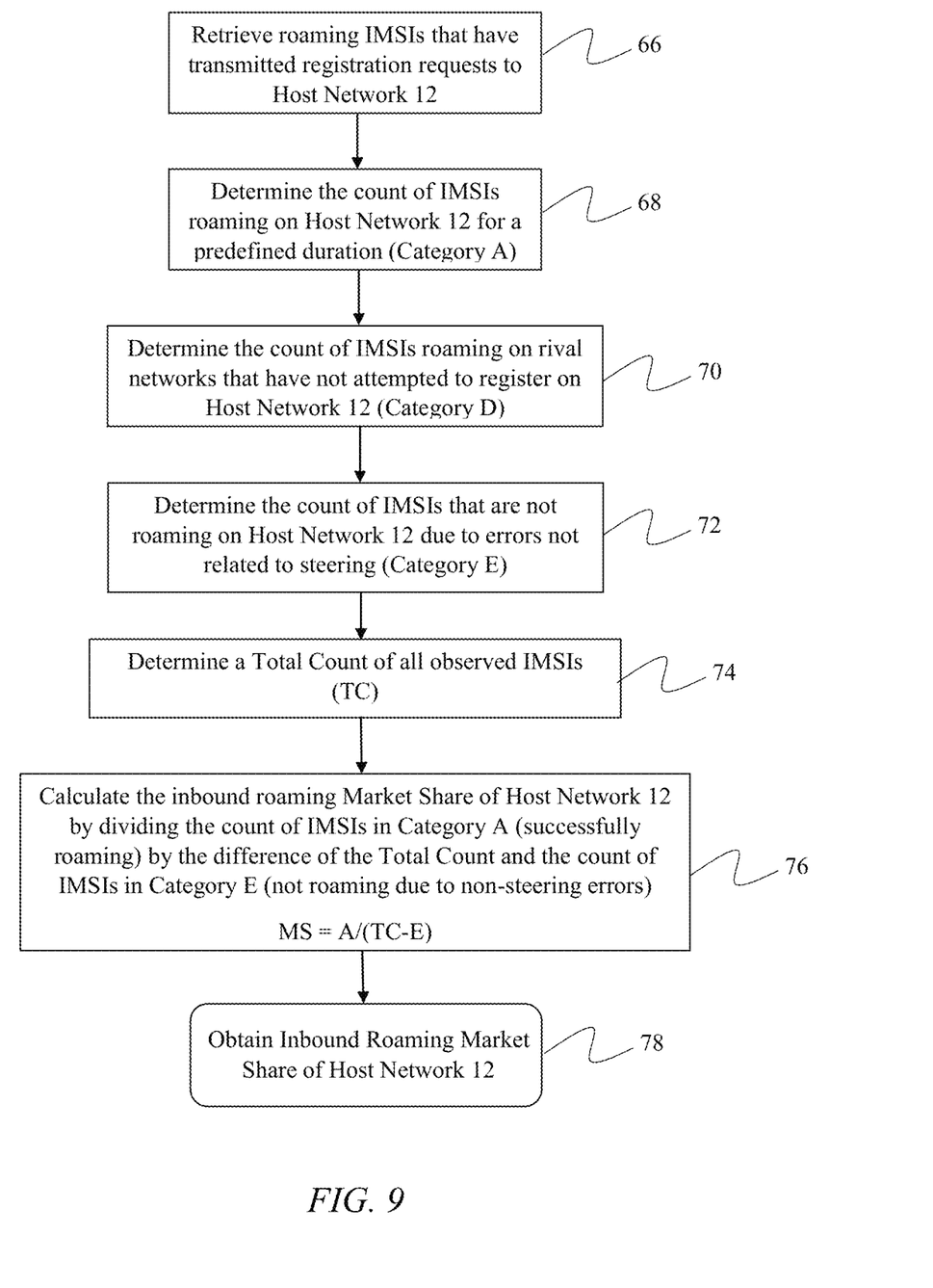
FIG. 9 is a flowchart depicting a method of calculating inbound roaming market share of a host network.

FIG. 9 is a flowchart depicting the method according to which the Market Share of Host Network 12 is calculated. In step 66, IMSIs that have attempted to register on Host Network 12 are retrieved. In step 68, the count of IMSIs that fall within Category A is determined based on whether each IMSI remained registered on Host Network 12 for a duration exceeding a predefined threshold. In step 70, the count of IMSIs in Category D is determined per method disclosed in FIG. 7 and explained above. In step 72, the count of IMSIs that are not roaming on Host Network 12 due to non-steering errors—Category E—is established. In step 74, the Total Count of all observed IMSIs is determined. In step 76, the count of IMSIs in Category A is divided by the Total Count minus the count of IMSIs in Category E. Finally, the result of step 74 yields inbound roaming market share of Host Network 12 in step 78.

The following is a set of exemplary calculations that are used to determine the market share:

Since Total Count (TC)=$A+B+C+D+E+F$,

Then, in this example, TC=90+87+25+110+50+80

TC=442

Market Share (MS %)=$A\div(TC-E)*100$,

In this example, MS %=90÷(442−50)*100%

So, MS %=90÷329*100%

Therefore, MS %=22.9%

Figure 10:
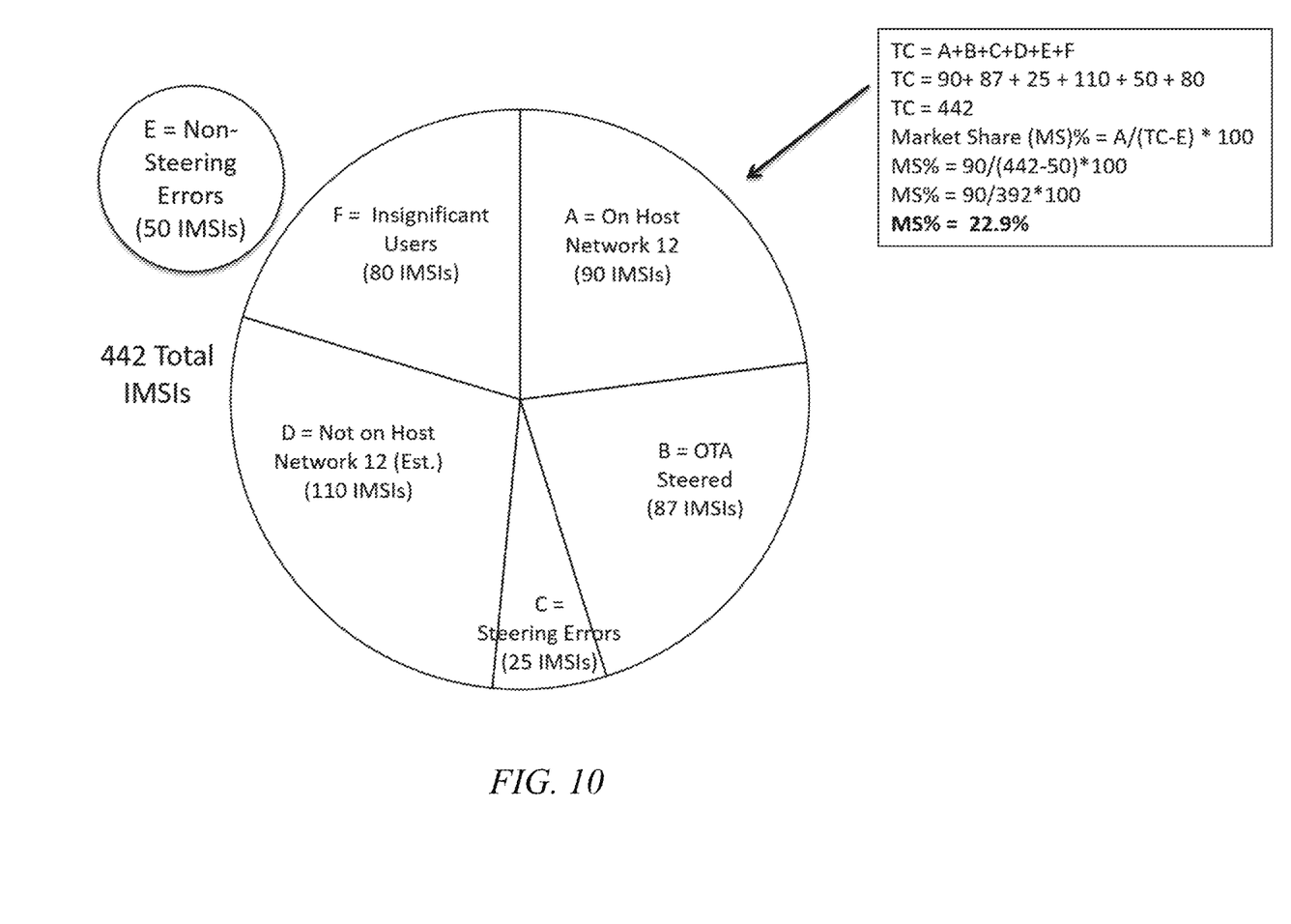
FIG. 10 is an exemplary pie chart depicting distribution of IMSI within the six (6) categories.

FIG. 10 provides a pie chart illustrating the results of the above calculations.

Hardware and Software Infrastructure Examples

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

DEFINITIONS, ACRONYMS, AND ABBREVIATIONS

TABLE 1

| Definitions, Acronyms, and Abbreviations | |
| --- | --- |
| Acronyms and Abbreviations | Description |
| GMT | Greenwich Mean Time (also known as Universal Mean Time) GMT does not observe daylight savings time |
| GPRS | General Packet Radio Service |
| IRMS | Inbound Roaming Market Share |
| IMSI | International Mobile Subscriber Identity |
| MCC | Mobile Country Code |
| MNC | Mobile Network Code |
| MOC | Mobile Originated Call |
| MTC | Mobile Terminated Call |
| NLU | Network Location Update |
| MSU | Message Signal Unit |
| OTA | Over-The-Air |
| PMN | Public Mobile Network |
| PRL | Preferred Roaming List |
| SMS | Short Message Service |
| SMSC | Short Message Service Center |
| SMS MO | Mobile Originated SMS |
| SMS MT | Mobile Terminated SMS |
| SoR | Steering of Roaming |

TABLE 1-continued

Definitions, Acronyms, and Abbreviations

| Acronyms and Abbreviations | Description |
| --- | --- |
| VPMN | Visited Public Mobile Network (a serve operator) |

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method for determining an inbound roaming traffic market share of a host network comprising:
    providing a server having access to messages transmitted between the host network and a plurality of home networks;
    observing by the server a plurality of international mobile subscriber identities (IMSIs), each IMSI identifying a subscriber of one of the plurality of home networks;
    determining a duration during which each IMSI remained registered on the host network during a predefined time period;
    responsive to the duration exceeding a predefined threshold, categorizing the IMSI as successfully roaming on the host network;
    determining a first count of IMSIs categorized as successfully roaming on the host network;
    determining a second count of IMSIs roaming on rival networks by utilizing send routing information for short message (SRI-for-SM) results of short message service (SMS) activity between IMSIs registered on the host network and IMSIs not registered on the host network;
    determining a third count of IMSIs that are not registered on the host network due to non-steering errors;
    determining a total count of IMSIs; and
    calculating an inbound roaming traffic market share of the host network by finding a quotient of the first count and a difference of the total count and the third count.

2. The method according to claim 1, wherein the total count of IMSIs observed by the server comprises IMSIs classified within categories selected from the group consisting of successfully roaming on the host network, were roaming on the host network but steered to a rival network, not roaming on the host network due to errors related to steering, not roaming on the host network due to errors not related to steering, roaming on the host network for a duration below the threshold duration, and roaming on the rival network without attempting to register on the home network.

3. The method according to claim 2, wherein an IMSI showing a successful registration on the host network for a duration less than a predefined threshold is classified as roaming on the host network for a duration below the threshold duration.

4. The method according to claim 2, wherein an IMSI showing a successful registration on the host network and a subsequent SMS followed by a location cancel within a predefined duration and no subsequent activity is classified as was roaming on the host network but steered to a rival network.

5. The method according to claim 2, wherein an IMSI having only failure messages due to steering return errors is classified as not roaming on the host network due to errors related to steering.

6. The method according to claim 2, wherein an IMSI having failure messages due to non-steering return errors is classified as not roaming on the host network due to errors not related to steering.

7. The method according to claim 1, wherein calculating the second count comprises the steps of:
    calculating a ratio, wherein a numerator in the ratio is a first quantity of recipient IMSIs in SRI-for-SM query results that have not requested to register on the host network and a denominator of the ratio is a total count of recipient IMSIs in SRI-for-SM query results; and
    multiplying the ratio by a second quantity of IMSIs that have requested to register on the host network.

8. The method according to claim 1, wherein the duration during which each IMSI remained registered on the host network is calculated as an aggregate over the predefined time period.

9. The method according to claim 1, wherein the predefined time period is a 24-hour Greenwich Mean Time (GMT) day.

10. The method according to claim 1, wherein the inbound roaming market share is calculated separately for voice services and data services.

11. A method for determining an inbound roaming traffic market share of a host network comprising:
    providing a server having access to messaging transmitted between the host network and a plurality of home networks;
    observing by the server a plurality of international mobile subscriber identities (IMSIs), each IMSI identifying a subscriber of one of the plurality of home networks;
    determining a duration during which each IMSI remained registered on the host network during a predefined time period;
    responsive to the duration exceeding a predefined threshold, categorizing the IMSI as successfully roaming on the host network;
    determining a first count of IMSIs categorized as successfully roaming on the host network;
    observing send routing information for short message (SRI-for-SM) results of short message service (SMS) activity between IMSIs registered on the host network and IMSIs not registered on the host network;
    determining a second count of IMSI categorized as roaming on rival networks by:
    finding a ratio of recipient IMSIs in SRI-for-SM query results that have not requested to register on the host network and all recipient IMSIs in SRI-for-SM query results;
    calculating a product of the ratio and a count of all IMSIs that have transmitted requests to register on the host network;
    determining a third count of IMSIs that are not registered on the host network due to non-steering errors;
    determining a total count of roaming IMSIs by obtaining a sum of all IMSIs that attempted to register on the host network plus the second count of IMSIs categorized as roaming on the rival networks;

calculating an inbound roaming traffic market share of the host network by finding a quotient of the first count and a difference of the total count and the third count.

12. The method according to claim 11, wherein the total count of IMSIs observed by the server comprises IMSIs classified within categories selected from the group consisting of successfully roaming on the host network, were roaming on the host network but steered to a rival network, not roaming on the host network due to errors related to steering, not roaming on the host network due to errors not related to steering, roaming on the host network for a duration below the threshold duration, and roaming on the rival network without attempting to register on the home network.

13. The method according to claim 12, wherein an IMSI showing a successful registration on the host network for a duration less than a predefined threshold is classified as roaming on the host network for a duration below the threshold duration.

14. The method according to claim 12, wherein an IMSI showing a successful registration on the host network and a subsequent SMS followed by a location cancel within a predefined duration and no subsequent activity is classified as was roaming on the host network but steered to a rival network.

15. The method according to claim 12, wherein an IMSI having only failure messages due to steering return errors is classified as not roaming on the host network due to errors related to steering.

16. The method according to claim 12, wherein an IMSI having failure messages due to non-steering return errors is classified as not roaming on the host network due to errors not related to steering.

17. The method according to claim 11, wherein the duration during which each IMSI remained registered on the host network is calculated as an aggregate over the predefined time period.

18. The method according to claim 17, wherein the predefined time period is a 24-hour Greenwich Mean Time (GMT) day.

19. The method according to claim 11, wherein the inbound roaming market share is calculated separately for voice services and data services.

* * * * *